March 21, 1961  M. D. BURROWS ET AL  2,975,839
DETACHABLE POWER UNIT FOR LAWN AND GARDEN ATTACHMENTS
Filed Sept. 13, 1956  3 Sheets-Sheet 1
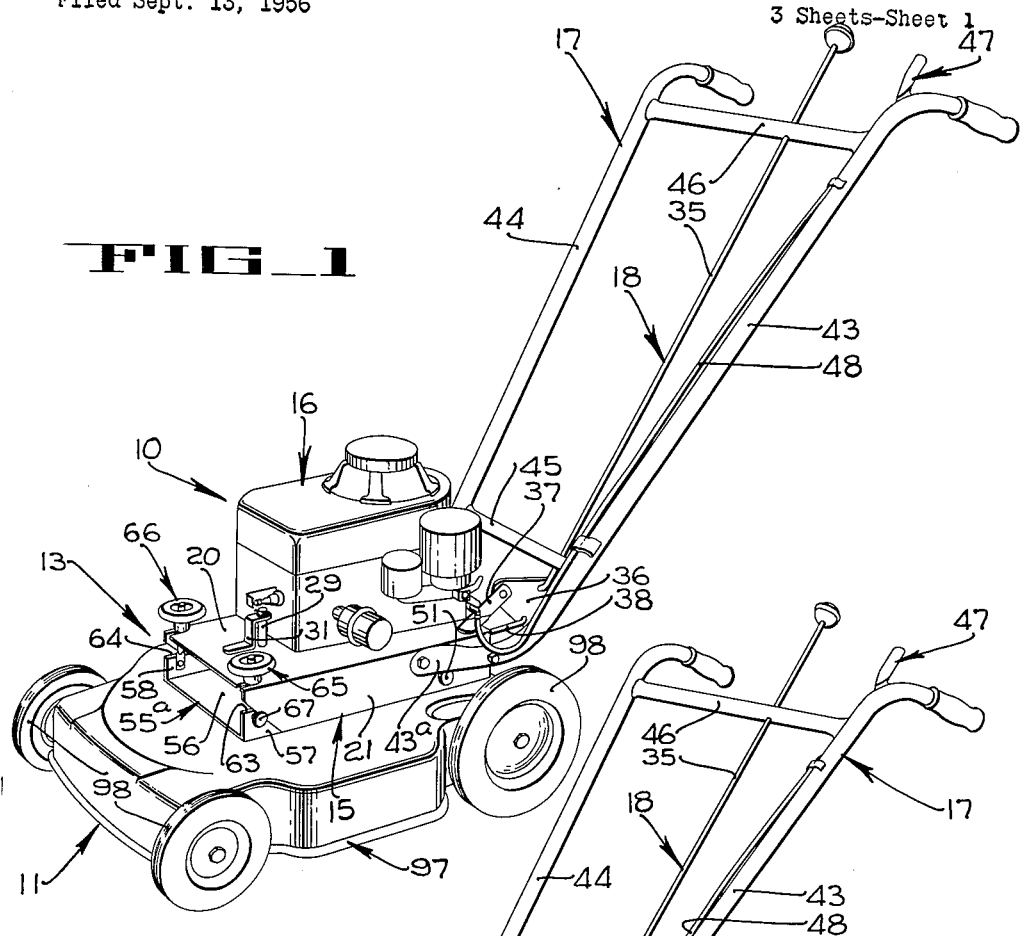
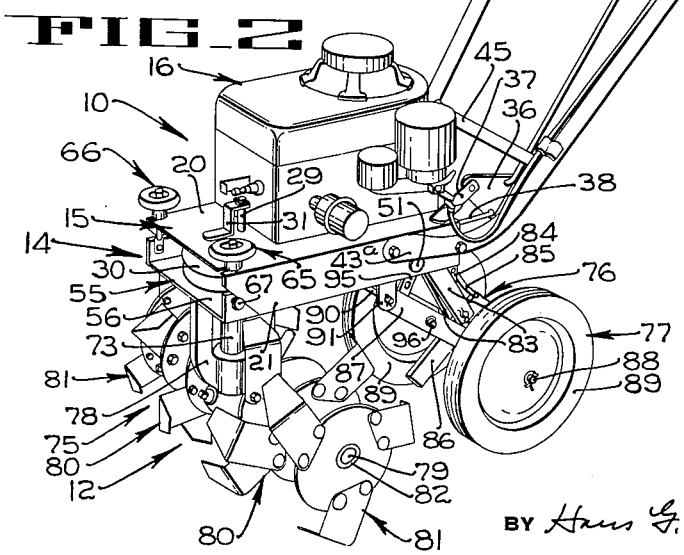
INVENTORS
MILFORD D. BURROWS
WALTER F. FIEBER
BY *Hans G. Hoffmeister*
ATTORNEY March 21, 1961 — M. D. BURROWS ET AL — 2,975,839
DETACHABLE POWER UNIT FOR LAWN AND GARDEN ATTACHMENTS
Filed Sept. 13, 1956 — 3 Sheets-Sheet 2
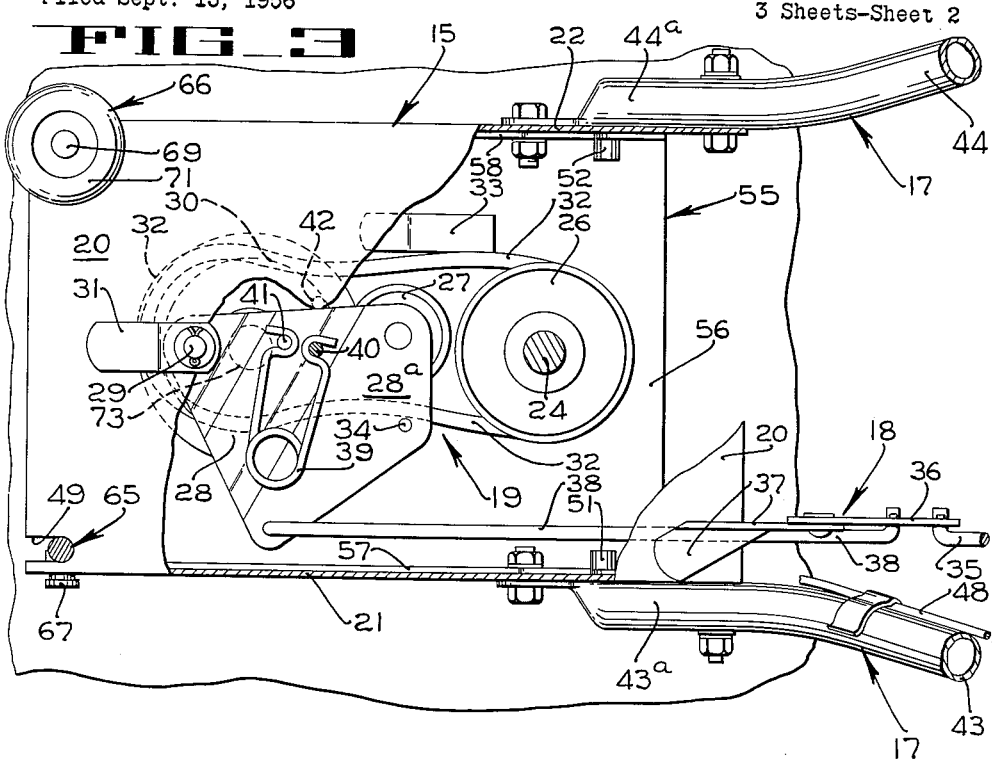
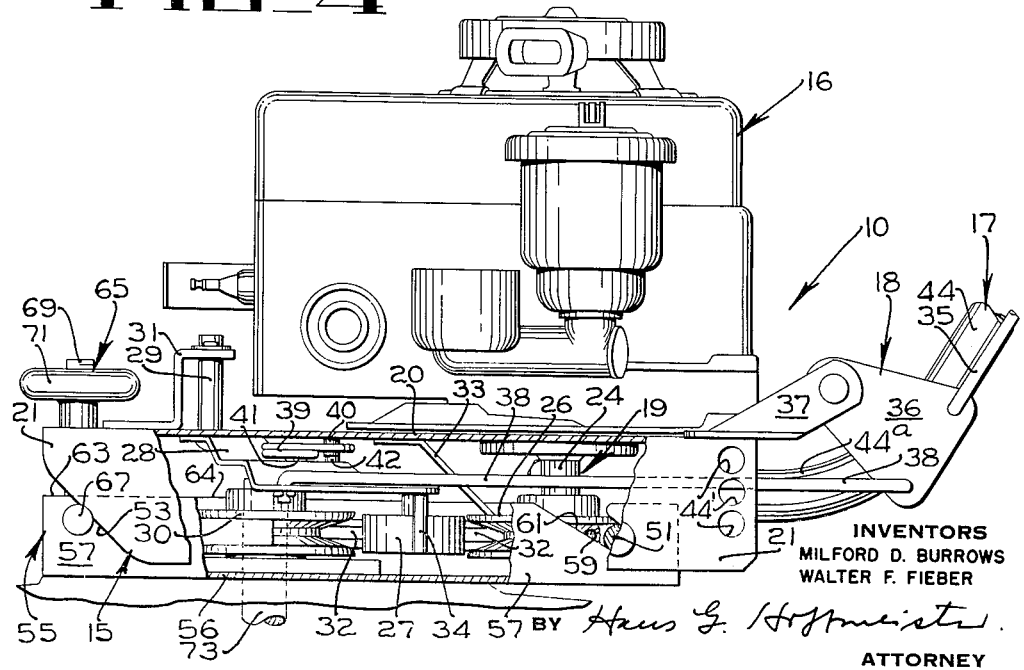
INVENTORS
MILFORD D. BURROWS
WALTER F. FIEBER
BY Hans G. Hoffmeister
ATTORNEY

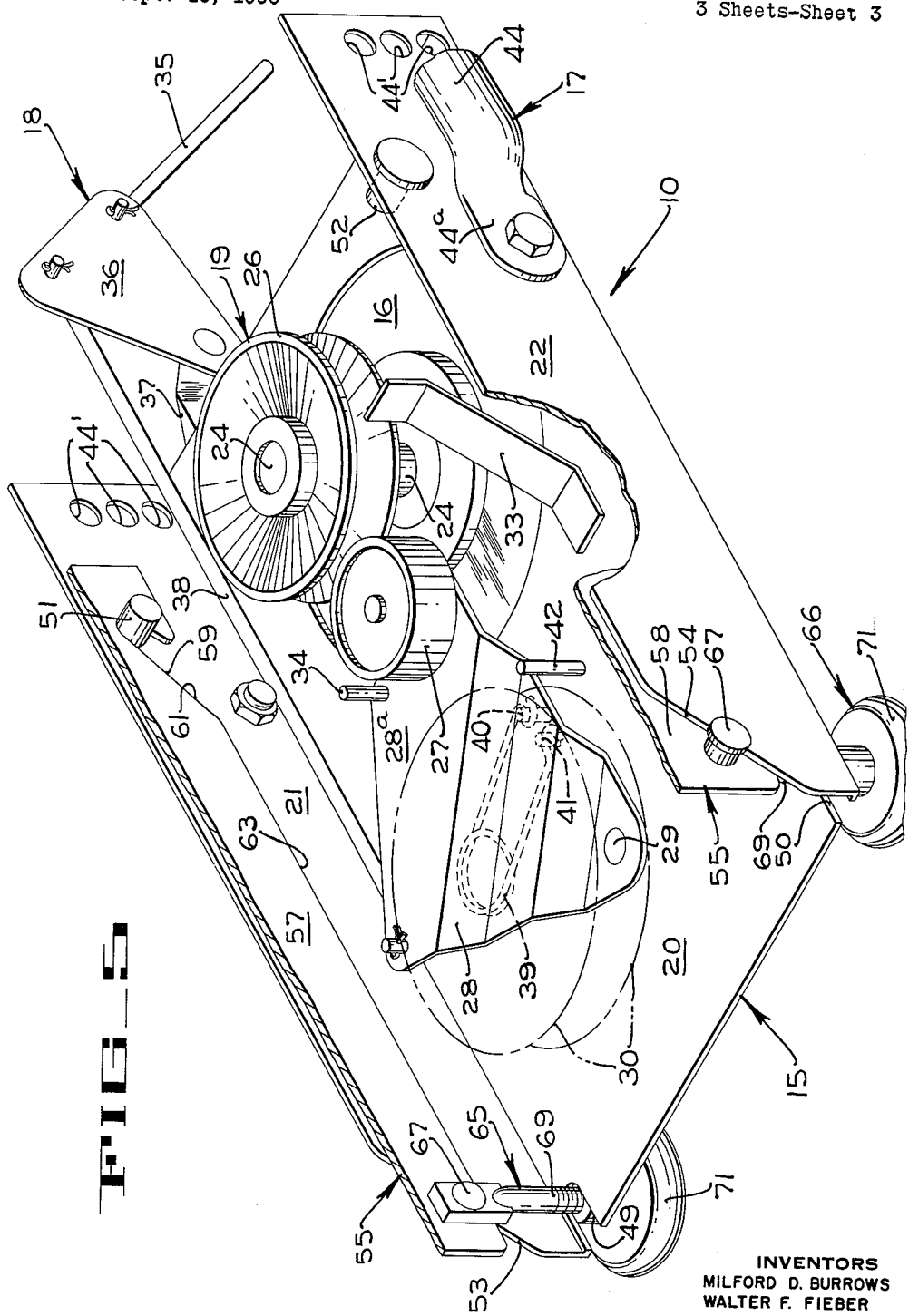

United States Patent Office 2,975,839
Patented Mar. 21, 1961

2,975,839

DETACHABLE POWER UNIT FOR LAWN AND GARDEN ATTACHMENTS

Milford D. Burrows, Thiensville, and Walter F. Fieber, Saukville, Wis., assignors to Food Machinery and Chemical Corporation, San Jose, Calif., a corporation of Delaware Filed Sept. 13, 1956, Ser. No. 609,628

11 Claims. (Cl. 172—125)

The present invention relates in general to agricultural and gardening implements, and more particularly to a detachable power unit capable of interchangeable use with a plurality of different driven units, such as tiller and mower attachments.

An object of the present invention is to provide a power unit which can be easily assembled with, and detached from, various gardening implements.

Another object of the present invention is to provide a power unit for gardening implements having an improved drive assembly.

Another object of the present invention is to provide an improved latching arrangement between a detachable power unit and a garden implement attachment.

These and other objects and advantages of the present invention will become apparent from the following description taken in conjunction with the accompanying drawings, in which:

Fig. 1 is a perspective of a power unit embodying the present invention mounted on a rotary mower.

Fig. 2 is a perspective of the power unit mounted on a tiller.

Fig. 3 is a fragmentary plan of the power unit of Fig. 2 with a portion broken away to illustrate the belt tensioning mechanism used with the present device.

Fig. 4 is a fragmentary side elevation of the power unit with a portion broken away to illustrate the drive mechanism.

Fig. 5 is a fragmentary perspective, viewed from below, of the power unit particularly illustrating the mechanism for securely mounting the power unit on a garden attachment unit.

The power unit 10 of the present invention is adapted to be quickly and easily assembled in driving engagement with several different types of attachments. As shown in Fig. 1, the power unit 10 is assembled with the rotary mower 11 to form a rotary lawn mower unit 13, while in Fig. 2 the power unit 10 is shown assembled on the tiller attachment 12 to provide a garden cultivator or tiller unit 14.

The power unit 10 (Fig. 1) comprises a base 15, an engine 16 mounted securely on the base 15, a steering handle bar assembly 17 secured to the rear of the base 15, an idler control linkage 18 attached to the rear of the base 15, and a drive assembly (Figs. 4 and 5) attached securely to the base 15 below the engine 16.

The base 15 (Fig. 5) is a rigid support member having an inverted U-shaped transverse cross section and including a horizontally disposed base plate 20 and depending, transversely spaced, parallel side plates 21 and 22 formed integrally therewith. The base plate 20 is of sufficient size to receive and support the engine 16 (Fig. 4) which may be of any conventional type that is suitable for use with garden implements, such as the rotary mower 13 and the tiller unit 14. Extending vertically from the engine 16 is a drive shaft 24, which is received by a suitable aperture in the base plate 20 and is connected to the drive assembly 19.

The drive assembly 19 (Figs. 4 and 5), which is attached to the base plate 20 and disposed below the engine 16, includes a drive pulley or sheave 26 secured to the lower end of the engine drive shaft 24 for rotation therewith. It is to be noted that the side plates 21 and 22 (Fig. 4) extend downwardly from the horizontal base plate 20 beyond the drive sheave 26 so that the bottom edges of the plates 21 and 22 provide a support upon which the power unit 10 may rest when not assembled on one of the attachments.

Included in the drive assembly 19 is an idler pulley 27 (Fig. 4) which is rotatably mounted in the horizontal plane of the drive sheave 26 and below the horizontal plate 20 on an offset portion 28a of an idler bracket 28. The idler bracket 28 is pivotally mounted to the base plate 20 by means of a pivot pin 29 which is received by an aperture in the base plate 20 and extends therethrough. For supporting the upper end of the pivot pin 29, a right angular bracket 31 is welded to the upper surface of the base plate and has an aperture therein receiving the upper portion of the pivot pin 29. Suitable means such as a cotter pin is provided for retaining the pivot pin 29 in position.

In order to drive an attachment pulley or sheave 30 (shown in dotted lines in Fig. 3) of the mower attachment 11 or the tiller attachment 12, a V-belt 32 is provided. The V-belt 32 (Fig. 3) is trained around the drive pulley 26 and around the sheave 30 while the idler pulley 27 is disposed between the runs of the V-belt 32. A stationary belt guide member 33 (Fig. 4), which is secured to the base plate 20, is positioned adjacent the idler pulley 27 exteriorly of the runs of the V-belt 32, while a movable belt guide pin 34 is secured to the idler bracket 28 and is positioned exteriorly of the runs of the belt 32. The idler pulley 27 is mounted on the bracket 28 so as to be disposed between the movable guide pin 34 and the fixed guide member 33. The fixed belt guide member 33 and the movable belt guide pin 34 assist in the assembly of the power unit 10 on an attachment by maintaining the V-belt 32 in a substantially elliptical shape, as shown in Fig. 3.

The idler control linkage 18 controls the movement of the idler pulley 27 between an idle position and a position of engagement with the belt 32, and comprises an upper control rod 35 (Fig. 1) secured to a triangular pivot plate 36. The pivot plate 36 is pivotally supported by a bracket 37 (Fig. 4), which is secured to the rear of the base plate 20. Also secured to the pivot plate 36 is one end of a lower control rod 38, which is movable in response to the movement of the upper control rod 35. The other end of the lower control rod is attached to the idler bracket 28, which carries the idler pulley 27. A spring 39 (Fig. 3) is attached at one end thereof to a fixed pin 40, which is secured to the horizontal base plate 20, while the other end of spring 39 is attached to a pin 41, which is secured to the idler bracket 28.

The fixed pin 40 and the movable pin 41 are so arranged with respect to the pivot pin 29, that upon slightly urging the idler bracket 28 in a counterclockwise direction about pin 29, as viewed in Fig. 3, the torsion spring 39 will continue to urge the bracket 28 in the same direction. Similarly, a slight amount of mechanical movement of the bracket 28 in a clockwise direction, as viewed in Fig. 3, will cause the torsion spring 39 to continue to urge the bracket 28 in the clockwise direction. An idler bracket stop 42 is provided to prevent excessive counterclockwise rotation of the idler bracket 28. When the idler bracket 28 rotates in the clockwise direction, as viewed in Fig. 3, the idler pulley 27 engages the V-belt 32 and tensions it around the pulley 26 and the sheave 30, thereby performing the function of a belt tensioning clutch for the power unit 10. Thus, by pushing the upper idler control rod 35 downwardly, the idler pulley is urged into engagement with the V-belt 32 and is held thereagainst by the torsion spring 39. Upon pulling the upper idler control rod 35 upwardly, the idler bracket 28 is moved against the bracket stop 42 which defines the untensioned, idle position of the belt 32, as shown in Fig. 3. When the belt 32 is tensioned, the garden implement attachment is driven through the driven sheave 30 thereof, and when the belt 32 is untensioned, the garden implement attachment is stationary.

The guiding or steering handle bar assembly 17 (Fig. 1) comprises a pair of elongated tubular rods 43 and 44 which have lower end portions 43a and 44a (Fig. 3) secured to the side plates 21 and 22, respectively, by suitable means such as bolts. As shown in Fig. 5, three vertically arranged apertures 44' are provided in the rearward end of each side plate 21 and 22 to provide vertical adjustment for the handle bar assembly 17. Transverse bars 45 and 46 are rigidly secured between the rods 43 and 44 and extend therebetween to rigidly space the rods. If desired, each rod may be made in two pieces with one piece telescoping into the other piece to provide a further vertical adjustment of the arms. The bar 46 also supports the upper portion of the idler control rod 35. A throttle assembly 47 is secured to the rod 43 and is connected to the engine 16 by a cable 48, which is secured by clips to the rod 43. The throttle assembly 47 controls the speed and operation of the engine 16.

In order that the power unit 10 may be easily assembled with or detached from various garden attachments, the base 15 of the power unit 10 has a pair of transversely spaced longitudinally disposed latch slots 49 and 50 formed in the forward edge of the horizontal plate 20, and the side plates 21 and 22 (Fig. 5) are provided adjacent their rearward end with inwardly extending transversely aligned mounting pins or studs 51 and 52, respectively. Forward edges 53 and 54 of the side plates 21 and 22, respectively, are beveled at an angle of approximately 45°.

Each of the different garden attachments, such as the rotary mower 11 and the tiller 12, is provided with a channel-shaped mounting frame 55 (Fig. 2). The attachment mounting frames 55 of the different attachments are substantially similar so that a description of one is sufficient to describe the other. The mounting frame 55 has substantially a U-shaped transverse cross section and is of a dimension and contour such that its base 56 and its side walls 57 and 58 fit inside the walls 21 and 22 of the base 15 of power unit 10, as shown in Fig. 3.

To receive the mounting studs 51 and 52 of the power unit 10, an inclined or beveled slot 59 is provided in the rearward portion of each of the side plates 57 and 58 of the attachment frame 55. As shown in Fig. 4, each inclined slot 59 has a downwardly and rearwardly sloping camming surface 61, which extends downwardly from the upper edges 63 and 64 of the respective side plates 57 and 58 at an acute angle and terminate in semicircular recesses suitable for receiving the studs 51 and 52. In mounting the power unit 10 on an attachment, the mounting studs 51 and 52 are placed on the camming surfaces 61 and urged rearwardly while the base 15 and the engine thereon are held in a forwardly and upwardly inclined position. The camming surfaces 61 guide the movement of the studs 51 and 52, and the semicircular recesses limit the rearward movement thereof. This arrangement facilitates the mounting of the power unit by permitting a lowering movement, which enables self-adjustment of the mounting frame.

The attachment mounting frame 55 is further provided with a pair of latches or hand wheel assemblies 65 and 66 (Fig. 1). Each hand wheel assembly 65 and 66 comprises a transversely spaced shoulder pin 67, which is pivotally mounted on the forward end of each of the side plates 57 and 58. Each pin 67 is secured at its inboard end to a threaded stud 69, which has a hand wheel 71 mounted thereon in threaded engagement. The hubs of the hand wheels 71 are of sufficient diameter so as to engage the upper surface of the mounting plate 20, when the studs 69 are swung into the slots 49 and 50 in the plate 20.

After the mounting studs 51 and 52 are positioned in the inclined slots 59, the threaded studs 69 of the hand wheel assemblies are pivoted into the latch slots 49 and 50 of the base frame 20. The hand wheels 71 are threaded down onto the studs 69 so as to be lowered into engagement with the mounting plate 20. The lowering of the hand wheels 71 is continued until the edges 53 and 54 of the side plates 21 and 22 are resting in firm contact against the shoulder pins 67 as shown in Fig. 4. Then, as the handwheels are moved further downward, the engine base is cammed rearwardly to firmly seat the studs 51 and 52 in the slots 59, thereby providing a rigid attachment between the power unit 10 and the garden implement attachment.

The attachment base frame 55 is provided with a vertically extending attachment drive shaft 73, which is received by a suitable aperture in the attachment base plate 56. Secured to the drive shaft 73 is the attachment driven pulley or sheave 30, which is positioned above the base plate 56 and between the side plates 57 and 58 of the attachment frame 55.

In mounting the power unit 10 upon an attachment, such as a mower 11 or tiller 12, the V-belt 32 is first positioned with the idler pulley 27 in the center of the belt 32 as shown in Fig. 3. The power unit 10 is then placed above the attachment unit with the V-belt 32 trained around the driven sheave 30 of the attachment unit. The mounting studs 51 and 52 are then placed in the inclined slots 59 and the power unit is locked on the attachment as explained above.

The tiller attachment 12 (Fig. 2) comprises a mounting frame 55, a tiller assembly 75, a drag link assembly 76 and a wheel assembly 77. The tiller assembly 75 includes a housing 78, which is secured to the under surface of the attachment mounting frame 55. The drive shaft 73, on which the driven pulley 30 is secured, is rotatably mounted in the housing 78. A drive gear (not shown) is secured to the lower end of shaft 73 and is in mesh with a driven gear (not shown) that is keyed to a rotatable shaft 79 at its midpoint. The shaft 79 is suitably mounted for rotation in the lower portion of housing 78 and extends outwardly therefrom in a horizontal direction. Tine assemblies 80 are secured to the shaft 79 for rotation therewith. At each end of the shaft 79 a tine extension unit 81 is supported on a tubular mounting 82 carried by the shaft 79.

The drag link assembly 76 comprises a pair of downwardly inclined parallel members 83, which are secured to to the under surface of the attachment base plate 56 and extend rearwardly therefrom. A vertically extending strap 84 is secured between the parallel members 83. The strap 84 has an aperture at the upper end thereof to receive for pivotal mounting a U-shaped latch 85. Pivotally mounted to and between the members 83 is a downwardly extending drag link 86. In Fig. 2, the latch 85 is shown holding the drag link 86 in a transporting position clear of the ground. When the latch 85 is released and the drag link 86 is pivoted into a substantially vertical position, the lower portion thereof drags in the soil to prevent a rapid forward speed of the tiller unit 14.

The wheel assembly 77 includes a pair of downwardly and outwardly sloping parallel support members 87 (one only shown), which support an axle 88 at the lower end thereof. Rotatably mounted on the axle 88 are the wheels 89. The upper ends of the support members 87 are suitably apertured to receive a shaft 90, which is also received in suitable apertured tabs 91 (only one being shown) on opposite sides of the mounting plate 56 to pivotally attach the wheel assembly 77 to the attachment frame 55.

The depth of penetration of the tillers may be regulated by means of a bar 95 that is pivotally mounted near the midpoint of a rod 96 which extends between the support members 87. At its upper end (not shown) the bar 95 has a plurality of holes into which a pin is inserted to adjustably secure the bar 95 to the two inclined members 83 that are attached to the base plate 56.

In the operation of the tiller unit 14, the operator starts the engine 16. Thereupon, he pushes the idler rod 35 downwardly, thus engaging the V-belt 32 with the attachment driven sheave 30, to cause the tine assembly 75 to rotate. The rotating tines 80 and 81 till the soil and assist in advancing the tiller unit forwardly. In order to disengage the attachment driven sheave 30 from the V-belt 32, the idler control rod 35 is pulled in an upward direction.

The rotary mower attachment 13 (Fig. 1) includes the attachment frame 55a which is similar in construction to frame 55 and is secured to a mower housing 97. Wheels 98 are rotatably mounted on all four corners of the housing. A bearing housing (not shown) is mounted within the housing 97 and is adapted to receive the shaft 73 on which the attachment driven sheave 30 is secured. A rotary cutter blade (not shown) is secured to the lower end of the shaft 73 for rotation therewith.

In the operation of the rotary mower unit 13, the power unit is mounted on the attachment base plate 55a in the manner previously described. The engine 16 is started resulting in a rapid rotation of the cutting blade. The operator manually pushes the mower unit 13 to advance the same over a grass lawn.

While the present invention has been described in connection with a mower and tiller attachment, it is to be understood that the inventive concept hereof is adaptable for other garden and lawn implements such as rotary hoes, snow blowers, planters and the like.

It will be understood that modifications and variations of the embodiments of the invention disclosed herein may be resorted to without departing from the spirit of the invention, and the scope of the appended claims.

Having thus described our invention, what we claim as new and desire to protect by Letters Patent is:

1. Apparatus for detachably connecting a power unit and an implement attachment supporting said power unit comprising a first mounting frame normally carried by the implement attachment in a generally horizontal position, a second generally horizontal mounting frame on the power unit disposed in superposed relation to said first frame, a pair of spaced parallel side members on each of said frames, said pairs of side members being arranged in juxtaposition, mounting pin means projecting from each side member of one of said frames, means defining an open-ended bevel slot in each side member of the other frame with a wall of the slot forming a downwardly inclined pin camming surface and with the closed end of the slot forming a pin abutment surface, the inclination of the camming surface of each slot relative to the end of said slot being such that the force of gravity acting on said power unit frame urges said pin means into engagement with the closed ends of said slots, and means for detachably connecting said power unit frame to said implement attachment frame while pressing said pins against the closed ends of said slots.

2. A detachable connection for use between a power unit and an implement attachment comprising a horizontally disposed mounting member on said power unit, a pair of transversely spaced parallel side members projecting downwardly from said mounting member, a mounting pin on each of said side members, said mounting pins being inwardly disposed in spaced transverse alignment, a horizontally disposed attachment mounting member carried by said implement attachment, a pair of transversely spaced parallel attachment side members projecting upwardly from said attachment mounting member, and a downwardly directed bevel slot on each of said attachment side members, each slot having a wall extending from the upper horizontal edge of its associated attachment side member and continuing throughout its entire length in a downwardly sloping direction, said walls being arranged in spaced transverse alignment and being adapted to be engaged by said pins for guiding said pins downwardly toward the lower end of said bevel slots for detachably connecting said power unit to said implement attachment.

3. A detachable mounting arrangement for use between a power unit and an implement attachment comprising a horizontally disposed mounting member on said power unit, a pair of transversely spaced parallel side members projecting downwardly from said mounting member, a mounting pin on each of said side members, said mounting pins being inwardly disposed in spaced transverse alignment, a pair of horizontally disposed latch receiving slots at one end of said mounting member arranged in transverse alignment, a horizontally disposed attachment member carried by said implement attachment, a pair of transversely spaced parallel attachment side members projecting upwardly from said attachment mounting member, a downwardly disposed bevel slot on each of said attachment side members, each slot having a wall forming a downwardly directed camming surface, said camming surfaces being arranged in spaced transverse alignment and being adapted to be engaged by said pins for guiding said pins downwardly toward the lower ends of said bevel slots for detachably connecting said power unit to said implement attachment, and a releasable latch pivotally mounted on each of said attachment side members, said latches being arranged to be pivoted into said latch slots and arranged to engage said power unit mounting member when received by said latch slots for securing said power unit to said implement attachment.

4. The combination of a power unit and an implement attachment, said power unit comprising an engine, a vertical drive shaft connected at the upper end thereof to said engine to be driven thereby, a horizontally disposed mounting member for supporting said engine and having an aperture therein for receiving said drive shaft, a pair of spaced parallel mounting side members projecting downwardly from said mounting member, a mounting pin on each of said mounting side members, said mounting pins being inwardly disposed in spaced transverse alignment, a drive pulley connected to the lower end of said drive shaft to be driven thereby and disposed between said mounting side members, a belt trained around said drive pulley, an idler pulley positioned between the runs of said belt, an idler mounting plate supporting said idler pulley and pivotally mounted to said mounting member for horizontally positioning said idler pulley, a stationary belt guide member secured to said mounting member and spaced from said idler pulley to permit said belt to be rotatable therebetween, a movable belt guide member supported by said idler mounting plate and spaced from said idler pulley to permit said belt to be rotatable therebetween, said stationary belt guide member and said movable belt guide member being arranged to position said belt for facilitating the mounting of said power unit on said implement attachment, said implement attachment comprising an attachment drive shaft, a driven pulley having said belt trained therearound and secured to the upper portion of said attachment drive shaft for imparting rotatable movement thereto, a horizontally disposed attachment mounting member having an aperture therein to receive said attachment drive shaft, and a pair of spaced parallel attachment side members projecting upwardly from said attachment mounting member, each of said attachment side members having a downwardly disposed bevel slot, said bevel slots being arranged in spaced transverse alignment to receive said mounting pins for detachably mounting said power unit to said implement attachment.

5. The combination of a power unit and an implement atachment, said power unit comprising an engine, a vertical drive shaft connected at the upper end thereof to said engine to be driven thereby, a horizontally disposed mounting member for supporting said engine and having an aperture therein for receiving said drive shaft, a pair of spaced parallel mounting side members projecting downwardly from said mounting member, a mounting pin on each of said mounting side members, said mounting pins being inwardly disposed in spaced transverse alignment, a pair of horizontally disposed latch receiving slots at the forward end of said mounting member arranged in spaced transverse alignment, a drive pulley connected to the lower end of said drive shaft to be driven thereby and disposed between said mounting side members, a belt trained around said drive pulley, an idler pulley positioned between the runs of said belt, an idler mounting plate supporting said idler pulley and pivotally mounted to said mounting member for horizontally positioning said idler pulley, a stationary belt guide member secured to said mounting member and spaced from said idler pulley to permit said belt to be rotatable therebetween, a movable belt guide member supported by said idler mounting plate and spaced from said idler pulley to permit said belt to be rotatable therebetween, said stationary belt guide member and said movable belt guide member being arranged to position said belt for facilitating the mounting of said power unit on said implement attachment, said implement attachment comprising an attachment drive shaft, a driven pulley having said belt trained therearound and secured to the upper portion of said attachment drive shaft for imparting rotatable movement thereto, a horizontally disposed attachment mounting member having an aperture therein to receive said attachment drive shaft, a pair of spaced parallel attachment side members projecting upwardly from said attachment mounting member, each of said attachment side members having a downwardly disposed bevel slot, said bevel slots being arranged in spaced transverse alignment to receive said mounting pins for detachably mounting said power unit to said implement attachment, and a releasable latch pivotally mounted on each of said attachment side members, said latches being received by said latch slots for securing said power unit to said implement attachment.

6. The combination of a power unit and an implement attachment, said power unit comprising an engine, a vertical drive shaft connected at the upper end thereof to said engine to be driven thereby, a horizontally disposed mounting member for supporting said engine and having an aperture therein for receiving said drive shaft, a pair of spaced parallel side members projecting downwardly from said mounting member, each of said side members having a bevel forward edge, a mounting pin on each of said mounting side members, said mounting pins being inwardly disposed in spaced transverse alignment, a pair of horizontally disposed latch receiving slots at the forward end of said mounting member arranged in transverse alignment, a drive pulley connected to the lower end of said drive shaft to be driven thereby and disposed between said mounting side members, a belt trained around said drive pulley, an idler pulley positioned between the runs of said belt, an idler mounting plate supporting said idler pulley and pivotally mounted to said mounting member for horizontally positioning said idler pulley, a stationary belt guide member secured to said mounting member and spaced from said idler pulley to permit said belt to be rotatable therebetween, a movable belt guide member supported by said idler mounting plate and spaced from said idler pulley to permit said belt to be rotatable therebetween, said stationary belt guide member and said movable belt guide member being arranged to position said belt for facilitating the mounting of said power unit on said implement attachment, said implement attachment comprising an attachment drive shaft, a driven pulley having said belt trained therearound and secured to the upper portion of said attachment drive shaft for imparting rotative movement thereto, a horizontally disposed attachment mounting member having an aperture therein to receive said attachment drive shaft, a pair of spaced parallel attachment side members projecting upwardly from said attachment mounting member, each of said attachment side members having a downwardly disposed bevel slot, said bevel slots being arranged in spaced transverse alignment to receive said mounting pins for detachably mounting said power unit to said implement attachment, a transversely disposed attachment pin rotatably mounted on each of said attachment side members at the forward end thereof, a releasable latch secured to each of said attachment pins for pivotal movement, said latches being received by said latch slots for securing said power unit to said implement attachment, and means on each of said latches for urging the bevel edges of said side members into engagement with said attachment pins for providing a rigid attachment between said power unit and said implement attachment.

7. In a power unit adaptable for use with gardening implements, an engine, a drive shaft connected to said engine to be driven thereby, a mounting plate supporting said engine and having an aperture therein for receiving said drive shaft, a drive pulley secured to said drive shaft to be driven thereby, a drive belt trained around said drive pulley, an idler pulley disposed between the runs of said drive belt, an idler mounting bracket mounted on said mounting plate for movement about a pivot axis and arranged to support said idler pulley for movement between an idle position and a belt tensioning position, an idler control rod connected to said idler bracket for moving said idler mounting bracket about its pivot axis either in a direction to dispose said idler pulley in the belt tensioning position or in a direction to dispose said idler pulley in the idle position, a stationary pin mounted on said mounting plate, a movable pin carried by said idler mounting bracket adjacent to and intermediate of a line extending between the pivot axis of said idler mounting bracket and said stationary pin, and a torsion spring having one end thereof attached to said stationary pin and having the other end thereof attached to said movable pin for continuously urging said idler mounting bracket to move about its pivot axis in the direction initiated by said control rod.

8. A detachable mounting arrangement for use between a power unit and an implement attachment comprising a first mounting frame carried by the implement attachment, a second mounting frame on the power unit disposed in superposed relation to said first frame, a pair of latch receiving slots formed along an edge of said second frame at one end thereof and arranged in spaced transverse alignment, a pair of transversely spaced parallel side members on each of said frames, one side member of each pair being arranged in juxtaposition to a side member of the other pair, a mounting pin on each side member of said second frame, said mounting pins being disposed in transverse alignment adjacent the other end of said second frame, an open ended bevel slot in each side member of said first frame with a wall forming a downwardly inclined camming surface, said camming surfaces being arranged in transverse alignment and being adapted to be engaged by said pins for guiding said pins downwardly to the lower ends of said bevel slots for detachably connecting said power unit to said implement attachment, and a releasable latch pivotally mounted on each side member of said first frame adjacent said one end of said second frame, said latches being arranged to be pivoted into said latch slots and being adapted to engage said second frame when received by said latch slots for securing said power unit to said implement attachment.

9. A detachable mounting arrangement for use between a power unit and an implement attachment comprising a first mounting frame carried by the implement attachment, a second mounting frame on the power unit disposed in superposed relation to said first frame, a base plate for said second frame having a pair of horizontally disposed latch receiving slots formed along an end edge of said base plate at the end of said second frame, said latch slots being arranged in spaced transverse alignment, a pair of transversely spaced parallel side members on said second frame projecting downwardly from said base plate and having bevel edges in spaced transverse alignment adjacent said end edge of said base plate, said bevel edges being arranged to project downwardly and toward the other end of said second frame, a mounting pin on each side member of said second frame, said mounting pins being inwardly disposed in spaced transverse alignment adjacent the other end of said second frame, a pair of transversely spaced parallel side members on said first frame projecting upwardly therefrom, each side member of said first frame having a bevel slot with a wall forming an inclined camming surface that projects downwardly and toward said other end of said second frame, said camming surfaces being arranged in spaced transverse alignment and being adapted to be engaged by said pins for guiding said pins into said bevel slots for detachably connecting said power unit to said implement attachment, a shoulder pin rotatably mounted on each of said side members of said first frame adjacent said one end of said second frame, said shoulder pins being arranged to engage said bevel edges, a stud secured to each of said shoulder pins for pivotal movement, said studs being arranged to be pivoted into said latch slots, and means on each of said studs adapted to be moved into engagement with said base plate when its associated stud is received by its associated latch slot for urging said bevel edges to move downwardly in sliding guided engagement with said shoulder pins for seating said mounting pins of said power unit in said bevel slots of said implement attachment.

10. A detachable mounting arrangement for use between a power unit and an implement attachment comprising a horizontally disposed mounting member on said power unit, a pair of transversely spaced parallel side members projecting downwardly from said mounting member, each of said side members having a bevel forward edge directed downwardly and rearwardly, a mounting pin on each of said side members disposed adjacent the rearward edge thereof, said mounting pins being inwardly disposed in spaced transverse alignment, a pair of horizontally disposed latch receiving slots at the forward end of said mounting member arranged in spaced transverse alignment, a horizontally disposed attachment mounting member carried by said implement attachment, a pair of transversely spaced parallel attachment side members projecting upwardly from said attachment mounting member, a downwardly and rearwardly directed bevel slot for each of said attachment side members disposed adjacent the rearward edge of its associated attachment side member with a wall forming a downwardly and rearwardly sloping camming surface, said camming surfaces being arranged in spaced transverse alignment and being adapted to be engaged by said mounting pins for detachably connecting the rearward end of said power unit with the rearward end of said implement attachment, a transversely disposed attachment pin mounted on each of said attachment side members adjacent the forward edge thereof and arranged to be engaged by one of said bevel forward edges, a stud secured to each of said attachment pins for pivotal movement, said studs being arranged to be pivoted into said latch slots, and means adjustably mounted on each of said studs and arranged to engage said power unit mounting member when its associated stud is received by the associated latch slot for urging the bevel forward edges of said power unit side members to move downwardly and rearwardly in sliding guided engagement with said attachment pins for securely seating said mounting pins of said power unit in said bevel slots of said implement attachment.

11. A detachable connection for use between a power unit and an implement attachment supporting the power unit comprising an attachment plate having a pair of upwardly projecting side flanges, means providing on each side flange an open ended slot having a lower wall inclined downwardly and toward one end of said attachment plate and disposed directly opposite the slot in the other side flange, the lower end of each slot forming an abutment surface, a mounting plate having downwardly projecting spaced side flanges, each flange of said mounting plate having a pin adapted to be positioned in one of said downwardly inclined slots, and means operably connected between said mounting plate and the other end of said attachment plate for applying a force to said mounting plate in a direction to move said pins toward the lower end of said slots and into engagement with the abutment surfaces of said slots.

References Cited in the file of this patent

UNITED STATES PATENTS

| | | |
|---|---|---|
| 2,532,230 | Hupp | Nov. 28, 1950 |
| 2,533,804 | Hitchcock | Dec. 12, 1950 |
| 2,611,461 | Miller | Sept. 23, 1952 |
| 2,641,889 | Bright | June 16, 1953 |
| 2,690,637 | Timmins | Oct. 5, 1954 |
| 2,695,071 | Hupp | Nov. 23, 1954 |
| 2,711,805 | Hallead | June 28, 1955 |
| 2,792,770 | Ober | May 21, 1957 |
| 2,864,294 | Edrich et al. | Dec. 16, 1958 |

FOREIGN PATENTS

| | | |
|---|---|---|
| 702,236 | Great Britain | Jan. 13, 1954 |